(12) United States Patent
Das et al.

(10) Patent No.: US 9,945,359 B2
(45) Date of Patent: Apr. 17, 2018

(54) DC OUTPUT WIND TURBINE WITH POWER DISSIPATION

(71) Applicant: ABB Schweiz AG, Baden (CH)

(72) Inventors: Debrup Das, Raleigh, NC (US);
Jiuping Pan, Raleigh, NC (US);
Joseph A. Carr, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/826,067

(22) Filed: Aug. 13, 2015

(65) Prior Publication Data

US 2017/0045035 A1 Feb. 16, 2017

(51) Int. Cl.
*F03D 9/00* (2016.01)
*H02P 9/04* (2006.01)
*H01F 36/00* (2006.01)

(52) U.S. Cl.
CPC ................... *F03D 9/005* (2013.01)

(58) Field of Classification Search
USPC .......................... 290/44, 55; 323/360; 361/55
See application file for complete search history.

(56) References Cited

U.S. PATENT DOCUMENTS

| | | | |
|---|---|---|---|
| 4,511,807 A * | 4/1985 | Somerville | F03D 9/003 290/42 |
| 5,194,803 A * | 3/1993 | Visser | G05F 1/70 323/223 |
| 5,644,218 A * | 7/1997 | Emmerich | H02H 7/001 323/360 |
| 6,021,035 A | 2/2000 | Larsen et al. | |
| 7,394,166 B2 | 7/2008 | Teichmann et al. | |
| 7,586,216 B2 | 9/2009 | Li et al. | |
| 7,605,487 B2 | 10/2009 | Barton et al. | |
| 7,978,445 B2 | 7/2011 | Ritter | |
| 8,004,100 B2 * | 8/2011 | Scholte-Wassink | F03D 7/0296 290/44 |
| 8,080,891 B2 * | 12/2011 | Schramm | F03D 7/0248 290/44 |
| 8,421,270 B1 * | 4/2013 | Miller | H02J 3/02 307/45 |
| 8,674,665 B2 * | 3/2014 | Sheng | H02P 9/007 290/44 |
| 8,742,609 B2 * | 6/2014 | Helle | F03D 7/0224 290/44 |
| 8,786,119 B2 * | 7/2014 | Sole Lopez | H02P 9/007 290/43 |

(Continued)

*Primary Examiner* — Pedro J Cuevas
(74) *Attorney, Agent, or Firm* — Taft Stettinius & Hollister LLP

(57) ABSTRACT

A wind turbine is disclosed having a generator and rectifier and structured to provide direct current power that in one form is medium voltage direct current (MVDC). The wind turbine includes a crowbar circuit arranged to protect from a condition such as an overvoltage. The crowbar can be activated based on a voltage measurement or rate of change of voltage. A resistor can be coupled to the crowbar to absorb excess power provided by the generator during the overvoltage condition. Individual wind turbines in a wind farm can each have individual crow bars that can be activated based on local measurement of a voltage condition. In some forms the crowbar can be coupled with a transformer, for example coupled with a tertiary winding of a three winding transformer.

23 Claims, 3 Drawing Sheets

(56) References Cited

U.S. PATENT DOCUMENTS

| | | | | |
|---|---|---|---|---|
| 8,854,843 B2* | 10/2014 | Trainer | H02J 3/36 | 363/35 |
| 8,878,376 B2* | 11/2014 | Birk | F03D 7/02 | 290/43 |
| 8,994,202 B2* | 3/2015 | Gupta | F03D 9/003 | 290/44 |
| 8,994,206 B2* | 3/2015 | Bala | H02J 3/386 | 290/55 |
| 9,048,694 B2* | 6/2015 | Pan | H02J 3/36 | |
| 9,184,685 B2* | 11/2015 | Gupta | H02H 7/065 | |
| 9,197,069 B2* | 11/2015 | Alston | H02J 3/36 | |
| 9,217,420 B2* | 12/2015 | Parkhou | F03D 11/00 | |
| 9,300,132 B2* | 3/2016 | Pan | H02J 3/386 | |
| 9,353,732 B2* | 5/2016 | Gupta | H02J 3/386 | |
| 9,525,284 B2* | 12/2016 | Kim | H02J 3/386 | |
| 9,562,521 B2* | 2/2017 | Yogev | F03D 9/007 | |
| 9,567,975 B2* | 2/2017 | Hansen | F03D 7/0276 | |
| 2008/0084070 A1* | 4/2008 | Teichmann | H02J 3/38 | 290/55 |
| 2009/0230681 A1* | 9/2009 | Scholte-Wassink | F03D 7/0296 | 290/44 |
| 2010/0133823 A1* | 6/2010 | Schramm | F03D 7/0248 | 290/44 |
| 2010/0134935 A1* | 6/2010 | Ritter | F03D 9/003 | 361/55 |
| 2011/0025059 A1* | 2/2011 | Helle | F03D 7/0224 | 290/44 |
| 2011/0134574 A1* | 6/2011 | Ritter | H02P 9/007 | 361/21 |
| 2012/0001435 A1* | 1/2012 | Pearce | H02P 9/48 | 290/54 |
| 2012/0267955 A1* | 10/2012 | Zhan | H02J 1/06 | 307/31 |
| 2013/0027003 A1 | 1/2013 | Zheng et al. | | |
| 2013/0033268 A1* | 2/2013 | Parkhou | F03D 11/00 | 324/511 |
| 2013/0119663 A1* | 5/2013 | Birk | F03D 7/02 | 290/44 |
| 2013/0197704 A1* | 8/2013 | Pan | H02J 3/36 | 700/287 |
| 2013/0200619 A1* | 8/2013 | Sole Lopez | H02P 9/007 | 290/44 |
| 2013/0200714 A1* | 8/2013 | Pan | H02J 3/386 | 307/82 |
| 2013/0313826 A1* | 11/2013 | Gupta | H02H 7/065 | 290/44 |
| 2014/0001759 A1* | 1/2014 | Gupta | F03D 9/003 | 290/44 |
| 2014/0008912 A1* | 1/2014 | Gupta | H02J 3/386 | 290/44 |
| 2014/0146583 A1* | 5/2014 | Trainer | H02J 3/36 | 363/35 |
| 2014/0197639 A1* | 7/2014 | Bala | H02J 3/386 | 290/54 |
| 2015/0226185 A1* | 8/2015 | Beekmann | F03D 9/005 | 290/44 |
| 2015/0333504 A1* | 11/2015 | Qi | H02H 3/087 | 361/63 |
| 2016/0322816 A1* | 11/2016 | Das | H02J 3/06 | |
| 2016/0333854 A1* | 11/2016 | Lund | F03D 7/047 | |
| 2016/0333855 A1* | 11/2016 | Lund | F03D 7/048 | |
| 2016/0352091 A1* | 12/2016 | Qi | H02H 3/10 | |
| 2016/0369780 A1* | 12/2016 | Aubault | F03D 13/25 | |
| 2016/0372911 A1* | 12/2016 | Pan | H02H 3/042 | |
| 2017/0054291 A1* | 2/2017 | Qi | H02J 1/00 | |

\* cited by examiner

DC OUTPUT WIND TURBINE WITH POWER DISSIPATION

TECHNICAL FIELD

The present invention generally relates to DC output wind turbines, and more particularly, but not exclusively, to power dissipation in wind turbine farms having DC output wind turbines.

BACKGROUND

Providing power dissipation in wind turbines during curtailment or faults is required to prevent damage to the wind turbine equipment during such contingencies. Accordingly, a power dissipation circuit, such as a crowbar, is often placed within the wind farm. One common solution is to place the crowbar at the on-shore substation of the wind farm. However, such a placement is of little use when the fault is internal to the wind farm. An alternative is to place the crowbar across the DC bus of the frequency converter (AC/DC/AC) at each wind turbine as used in the conventional wind farms. This enables each turbine to dissipate its own power in the event of either an internal fault or an external fault. However, this is impractical in wind farms with a MVDC collection system. Here, only one AC/DC converter is used at each wind turbine for both controlling variable frequency operation and converting AC power to DC power. Consequently, the DC bus is shared between all wind turbines and a crowbar placed there would no longer provide individual power dissipation. Accordingly, there remains a need for further contributions in this area of technology regarding power dissipation equipment, placement and control methods for wind farms with MVDC collection system.

SUMMARY

One embodiment of the present invention is a unique DC output wind turbine with power dissipation accommodation. Other embodiments include apparatuses, systems, devices, hardware, methods, and combinations for dissipating power in DC output wind turbines. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
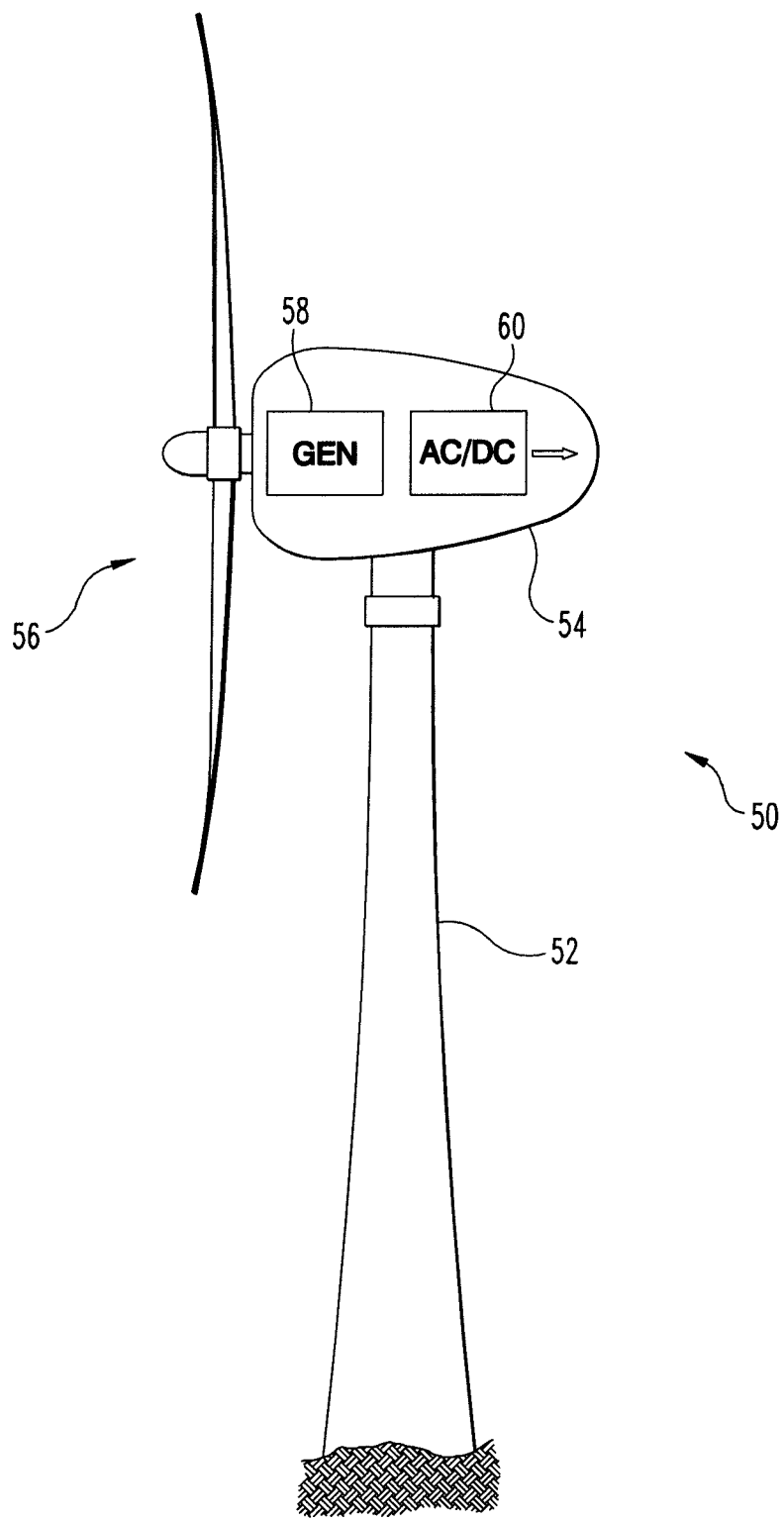
FIG. 1 depicts one embodiment of a DC output wind turbine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a wind turbine 50 is disclosed which includes a tower 52 and a nacelle 54 from which is attached a bladed rotor 56 structured to extract work from a passing wind. Internal to the nacelle 54 is a generator 58 capable of producing electrical power when driven by the bladed rotor 56. A converter 60 is used to produce DC output power which can be provided from the wind turbine 50 directly to a consumer, or can be combined with other similarly situated DC output wind turbines 50 such as in the arrangements discussed further below.

DC output provided by the wind turbine 50 can be physically accessed in or on the wind turbine 50 in some embodiments, while in other embodiments the DC output power can be located some distance away from the wind turbine such as but not limited to a platform, an onshore substation, etc. The output can be provided by cabling/wiring/etc while in other forms it can be represented by a terminal or other suitable device. In one form the DC output of the wind turbine can be provided to a bus that is in DC electrical communication with other similar wind turbines 50. The arrangement of the various wind turbines 50 can take on a variety of topologies as will be appreciated.

In one non-limiting embodiment the wind turbine 50 can be structured to output medium voltage direct current (MVDC) power and can additionally be one of many similarly arranged MVDC output power wind turbines that contribute power to a utility through an MVDC bus. As used herein medium voltage can be voltage that is 1 kV to 50 kV or higher.

Figure 2:
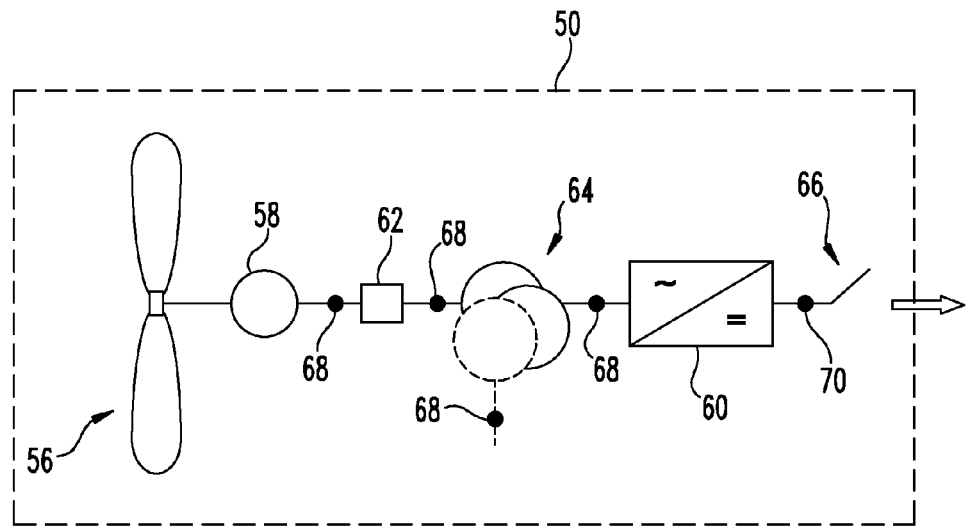
FIG. 2 depicts an embodiment of a wind turbine having possible locations for an AC crowbar.

Turning now to FIG. 2, one embodiment of wind turbine 50 depicted in FIG. 1 which further includes a breaker 62, transformer 64, and a switch 66. The arrangement depicted in FIG. 2 also shows possible locations for an AC crowbar 68 and a DC chopper 70 which are useful to protect electronics in case of a fault event that produces an overvoltage or other harmful condition. Although many different locations are shown for a possible AC crowbar 68, any given embodiment may include one or more particular crowbars from the locations depicted in FIG. 2. Furthermore, alternative and/or additional embodiments to FIG. 2 need not include the DC chopper 70 and may only include one or more of the AC crowbars 68. In this way the crowbar(s) 68 can be connected to any point, including any of points 68, on the AC side of the wind turbine 50.

The crowbar 68 can be triggered by any number of conditions, including a local voltage level of the DC bus as well as a rate of change of its voltage level. As will be understood by those in the art, the crowbar 68 can take on any variety of forms useful to activate a shunt. To set forth just a few nonlimiting examples, the crowbar can take the form of a resistor divider coupled with a zener diode that, when activated, triggers a thyristor to form a circuit. Not all crowbars need include components described above such as a zener diode. In one form the crowbar can include a bidirectional triode thyristor.

The crowbar 68 can be connected to an energy dissipation device such as a power dissipating resistor (shown in one nonlimiting embodiment below), which is useful to absorb excess power provided from the generator 58 during a fault such as but not limited to an overvoltage condition. The power dissipating resistor can be used during activation of the crowbar to generate resistive heat that is then transferred to a heat sink medium in lieu of energy being transmitted between the MVDC bus and wind turbine 50. Such a heat sink medium can be a fluid, whether that fluid is air and/or water. Any number and variety of resistors or other suitable energy dissipation devices can be used.

FIG. 2 depicts a three winding transformer having primary, secondary, and tertiary windings, though other applications can include any other variety of transformers 68 including but not limited to two winding transformers. Though FIG. 2 (and other embodiments discussed herein) depicts use of a transformer 64, the transformer 64 can be optional in other embodiments. For example, some embodiments can include a generator 58 that produces appropriate AC power that can be converted directly to medium voltage DC power without an intervening transformer 64.

The AC/DC converter 60 is illustrated in FIG. 2 as within the nacelle 54 of the wind turbine 50, but in other embodiments the converter 60 can be located elsewhere. For example, the converter 60 can be located elsewhere such as internal or external to the tower. To set forth just a few nonlimiting examples, the converter 60 can be located within the tower 52, a base of the tower 52, a platform located away from the wind turbine 50, an onshore substation, etc.

Figure 3:
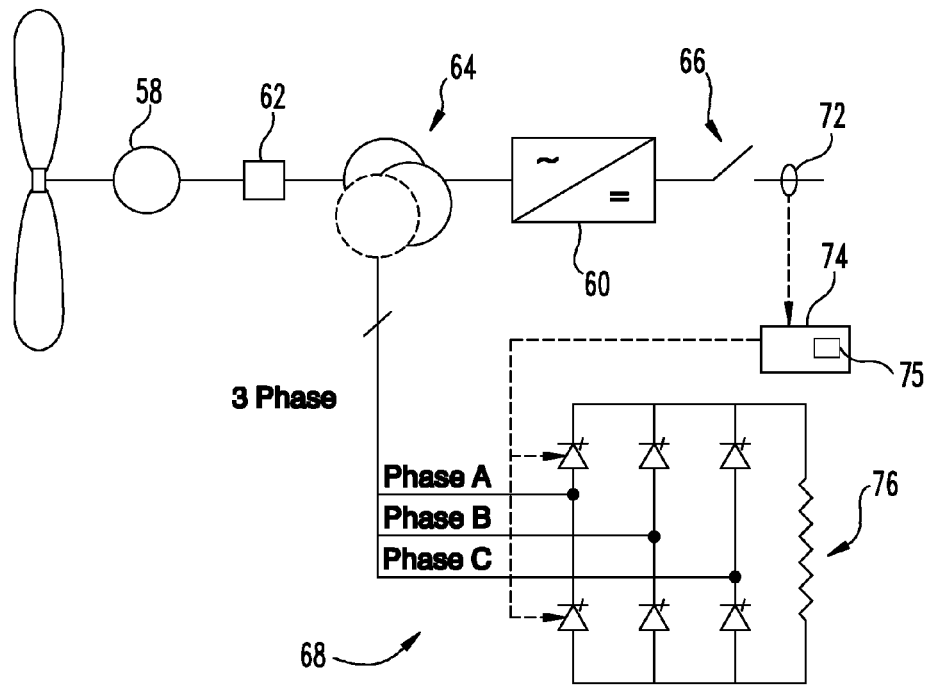
FIG. 3 depicts an embodiment of an AC crowbar circuit.

Turning now to the embodiment depicted in FIG. 3, one nonlimiting form of the AC crowbar 68 is shown in fuller detail. Although the crowbar 68 is depicted as coupled with the tertiary winding of a three winding transformer 64, the same arrangement of the crowbar 68 can be used in the other locations depicted in FIG. 2 above. The crowbar 68 is arranged as a three phase circuit coupled with a tertiary winding of the transformer 64, but in other embodiments the crowbar 68 be implemented in any variety of phase arrangements such as, but not limited to three phase, single phase, split phase, two phase, or any other plurality of phase arrangements.

Local voltage is measured at location 72 and is provided to a controller 74 which in turn generates a command signal to the crowbar 68. The "local" measurement of the fault can be a DC terminal associated with the wind turbine and/or DC bus (or portion thereof in proximity to the wind turbine 50), among other possible locations as will be appreciated. The command signal can be any appropriate signal based on local voltage 72 that is passed-through and/or calculated by the controller 74.

When activated by the controller 74 the crowbar 68 provides current to the resistor 76 which can be arranged and operated similar to the embodiment in FIG. 2. The controller 74 can be comprised of digital circuitry, analog circuitry, or a hybrid combination of both of these types. Also, the controller 74 can be programmable, an integrated state machine, or a hybrid combination thereof. The controller 74 can include one or more Arithmetic Logic Units (ALUs), Central Processing Units (CPUs), memories, limiters, conditioners, filters, format converters, or the like which are not shown to preserve clarity. In one form, the controller 74 is of a programmable variety that executes algorithms and processes data in accordance with operating logic that is defined by programming instructions (such as software or firmware). Alternatively or additionally, operating logic for the controller 74 can be at least partially defined by hardwired logic or other hardware. It should be appreciated that controller 74 can be exclusively dedicated to control of the crowbar 68, or may further be used in the regulation/control/activation of one or more other subsystems or aspects of wind turbine 50.

The crowbar 68 can be triggered by any number of conditions, whether implemented in the controller 74 or elsewhere. For example, the crowbar 68 can be triggered based upon a fixed voltage threshold as well as a rate of change of voltage. Any variety of schemes can be implemented to determine rate of change of voltage, including an electric circuit that includes a differentiator 75, as shown in FIG. 3.

Figure 4:
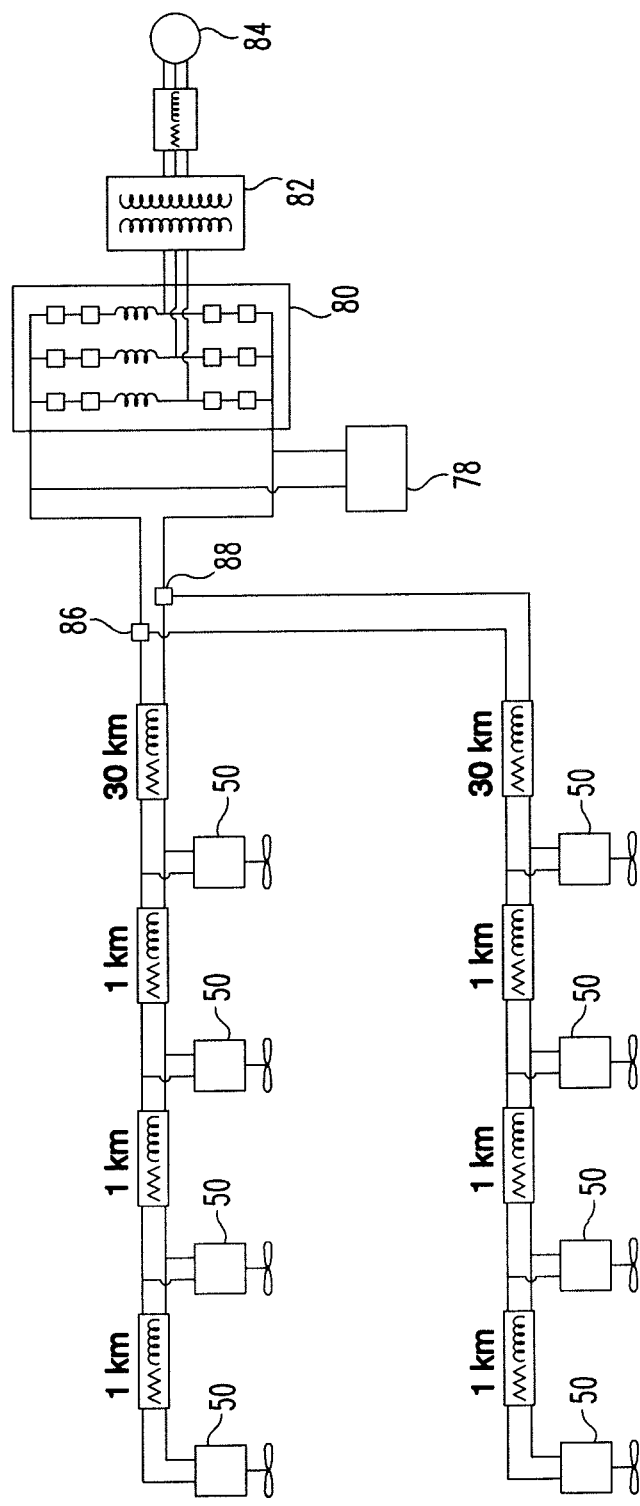
FIG. 4 depicts an embodiment of a wind farm having a plurality of wind turbines.

Turning now to FIG. 4, one embodiment is depicted of a wind farm that includes a plurality of wind turbines 50 with distributed crowbar protection as described in various embodiments herein. The wind turbines 50 are represented as separated by 1 km, but other embodiments can include a variety of other distances that need not be equal as depicted. The wind turbines 50 provide DC output as described above and are coupled with a utility grid 84 via a chopper circuit 78, grid inverter 80, and transformer 82. In some embodiments the chopper circuit 78 need not be included. Although one wind turbine farm is depicted in the illustrated embodiment, other embodiments can include additional farms that provide power to the utility grid 84.

During a fault condition in any of the embodiments above, the crowbar 68 can be activated to protect relevant devices. For example, in the case of external fault the wind farm and/or an individual wind turbine 50 may not be able to transfer the total generated energy to the AC grid. This type of fault may cause a rise in DC voltage detectable by the local measurement as described above, and as can be measured by, in, or on the wind turbines 50 in the farm. The AC crowbars 68 can thus be individually activated without the need for any communication between the wind turbines 50.

In case of an internal wind farm fault, such as a fault on the feeder, the wind turbines 50 on the faulted feeder would not be able to push power produced by the DC collection grid as the faulted feeder may be quickly disconnected from the collection grid by feeder switching (e.g. feeder switches 86 and 88 in FIG. 4). The affected wind turbine 50 can be quickly isolated from the DC fault by opening a breaker (either AC or DC), or by a fault blocking converter. For ease of discussion, assume the switch 66 shown in the figures above is opened. Thus, the power produced by the generator 56 needs to be dissipated or else run the risk of causing rotor acceleration or converter overvoltage, or both. The disconnection of the switch 66 can trigger the AC crowbar 68 of some affected wind turbines 50 to dissipate excess energy in lieu of mechanical braking system. After the faulted feeder or wind turbine 50 is isolated, the wind turbines 50 operating in ride-through mode can quickly return to normal operation. In the case of start-up or commissioning of a wind turbine 50 when the wind turbine 50 may be disconnected from the collection grid, the AC crowbar 68 can be used for small duration to prevent rotor acceleration and/or converter overvoltage.

One aspect of the present application includes an apparatus comprising a DC output wind turbine having a bladed rotor structured to rotate upon extraction of work from a wind and thereby produce a medium voltage output, the DC output wind turbine structured to communicate power to a wind farm DC bus, an electric generator operable to generate an AC electric current when driven by rotation of the bladed rotor, an AC/DC converter structured to convert the AC electric current to DC output of the DC output wind turbine, and a crowbar circuit in communication with the electric generator and structured to mitigate a fault when triggered by a voltage condition, the crowbar circuit including a dump resistor in powered communication with the electric generator upon triggering of the crowbar circuit, the dump resistor useful to absorb excess power from the electric generator during the fault.

One feature of the present application further includes the wind farm DC bus, and wherein the voltage condition is sensed at a DC terminal of the DC output wind turbine.

Another feature of the present application further includes wherein the crowbar circuit is electrically placed between the electric generator and the AC/DC converter.

Yet another feature of the present application includes wherein the medium voltage output of the DC output wind turbine is a medium voltage DC output between 1 kV and 50 kV or higher, wherein the crowbar circuit is a three phase crowbar circuit.

Still another feature of the present application includes wherein the crowbar is triggered by one of a voltage and a rate of change of voltage of the wind farm DC bus.

Still yet another feature of the present application further includes a transformer having a plurality of windings in electric communication with the electric generator and configured to change a voltage output level of the AC electric current provided by the electric generator.

Yet still another feature of the present application includes wherein the transformer is a three winding transformer having primary, secondary, and tertiary windings, wherein the crowbar circuit is electrically connected to the transformer.

A further feature of the present application includes wherein the three winding transformer is a three winding step-up transformer, and wherein the winding to which the crowbar circuit is in electrical communication with is the tertiary winding of the three winding transformer.

Another aspect of the present application includes an apparatus comprising a wind tower having a rotatable bladed assembly configured to extract energy from wind, a generator having a rotor mechanically rotated by work provided from the rotatable bladed assembly, the generator structured to provide alternating electric current (AC) power, a rectifier structured to convert AC power provided by the generator to direct electric current (DC) power, a medium voltage DC (MVDC) bus structured to receive DC power from the wind tower, the MVDC bus having at least a portion located external to the wind tower, and a crowbar structured to shunt current on an AC side of the wind tower between the generator and the rectifier and provide current to an energy dissipation device.

A feature of the present application includes wherein the crowbar is a three-phase crowbar.

Another feature of the present application includes wherein the crowbar is a thyristor-based shunt triggered by a voltage condition of the MVDC bus.

Still another feature of the present application includes wherein the crowbar is triggered by one of a voltage level at a DC terminal of the wind tower and a rate of change of voltage level at the DC terminal.

Yet still another feature of the present application further includes a three winding transformer, wherein the crowbar is in electrical communication with the tertiary winding of the three winding transformer.

Still yet another feature of the present application includes wherein the crowbar circuit includes an electric differentiator in triggered communication with a thyristor.

A further feature of the present application includes wherein the rectifier is located internal to the wind tower.

A still further feature of the present application includes wherein the energy dissipation device is a resistor, and which further includes a plurality of the wind towers structured to deliver MVDC power to the MVDC bus.

Still another aspect of the present application includes a method comprising rotating a bladed rotor of a wind turbine upon passage of wind relative to the wind turbine, converting AC power created by a generator powered by the bladed rotor to DC power, providing power from the DC power to an MVDC wind farm feeder, and activating a crowbar circuit on an AC side of the wind turbine upon detection of a voltage fault in the MVDC wind farm feeder.

A feature of the present application further includes changing voltage of the AC power through a transformer.

Another feature of the present application further includes communicating current between a tertiary winding of the transformer and the crowbar.

Still another feature of the present application further includes converting AC power to DC power on board the wind turbine.

Yet still another feature of the present application further includes powering a resistor in electrical communication with the crowbar circuit when the crowbar circuit is activated.

Still yet another feature of the present application further includes using one of voltage level and rate of change of voltage level of the MVDC wind farm feeder to activate the crowbar circuit.

A further feature of the present application further includes a plurality of wind turbines; and wherein each of the plurality of wind turbines is locally monitoring voltage of the MVDC wind farm feeder to individually activate a crowbar associated with each of the plurality of wind turbines.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. An apparatus comprising:
a DC output wind turbine having a bladed rotor structured to rotate upon extraction of work from a wind and thereby produce a medium voltage output, the DC output wind turbine structured to communicate power to a wind farm DC bus;
an electric generator operable to generate an AC electric current when driven by rotation of the bladed rotor;
an AC/DC converter structured to convert the AC electric current to DC output of the DC output wind turbine; and
a crowbar circuit in communication with the electric generator and structured to mitigate a fault when triggered by either of an external AC grid fault and an internal DC collection grid fault, the crowbar circuit including a dump resistor in powered communication with the electric generator upon trig- gering of the crowbar circuit, the dump resistor useful to absorb excess power from the electric generator during the fault.

2. The apparatus of claim 1, which further includes the wind farm DC bus, and wherein the voltage condition is sensed at a DC terminal of the DC output wind turbine.

3. The apparatus of claim 1, wherein the crowbar circuit is electrically placed between the electric generator and the AC/DC converter.

4. The apparatus of claim 3, wherein the medium voltage output of the DC output wind turbine is a medium voltage DC output between 1 kV and 50 kV or higher, wherein the crowbar circuit is a three phase crowbar circuit.

5. The apparatus of claim 4, wherein the crowbar is triggered by one of a voltage and a rate of change of voltage of the wind farm DC bus.

6. The apparatus of claim 1, which further includes a transformer having a plurality of windings in electric communication with the electric generator and configured to change a voltage output level of the AC electric current provided by the electric generator.

7. The apparatus of claim 6, wherein the transformer is a three winding transformer having primary, secondary, and tertiary windings, wherein the crowbar circuit is electrically connected to the transformer.

8. The apparatus of claim 7, wherein the three winding transformer is a three winding step-up transformer, and wherein the winding to which the crowbar circuit is in electrical communication with is the tertiary winding of the three winding transformer.

9. An apparatus comprising:
a wind tower having a rotatable bladed assembly configured to extract energy from wind;
a generator having a rotor mechanically rotated by work provided from the rotatable rotor, the generator structured to provide alternating electric current (AC) power;
a rectifier structured to convert AC power provided by the generator to direct electric current (DC) power;
a medium voltage DC (MVDC) bus structured to receive DC power from the wind tower, the MVDC bus having at least a portion located external to the wind tower; and
a crowbar structured to shunt current on an AC side of the wind tower between the generator and the rectifier and provide current to an energy dissipation device, the crowbar structured to be triggered by a fault condition in either of an external AC grid fault and an internal DC collection grid fault.

10. The apparatus of claim 9, wherein the crowbar is a three-phase crowbar.

11. The apparatus of claim 9, wherein the crowbar is a thyristor-based shunt triggered by a voltage condition of the MVDC bus.

12. The apparatus of claim 9, wherein the crowbar is triggered by one of a voltage level at a DC terminal of the wind tower and a rate of change of voltage level at the DC terminal.

13. The apparatus of claim 12, which further includes a three winding transformer, wherein the crowbar is in electrical communication with the tertiary winding of the three winding transformer.

14. The apparatus of claim 13, wherein the crowbar circuit includes an electric differentiator in triggered communication with a thyristor.

15. The apparatus of claim 9, wherein the rectifier is located internal to the wind tower.

16. The apparatus of claim 15, wherein the energy dissipation device is a resistor, and which further includes a plurality of the wind towers structured to deliver MVDC power to the MVDC bus.

17. A method comprising:
rotating a bladed rotor of a wind turbine upon passage of wind relative to the wind turbine;
converting AC power created by a generator powered by the bladed rotor to DC power;
providing power from the wind turbine to an MVDC wind farm feeder; and
activating a crowbar circuit on an AC side of the wind turbine upon detection of a voltage fault in the MVDC wind farm feeder.

18. The method of claim 17, which further includes changing voltage of the AC power through a transformer.

19. The method of claim 18, which further includes communicating current between a tertiary winding of the transformer and the crowbar.

20. The method of claim 18, which further includes converting AC power to DC power on board the wind turbine.

21. The method of claim 17, which further includes powering a resistor in electrical communication with the crowbar circuit when the crowbar circuit is activated.

22. The method of claim 17, which further includes using one of voltage level and rate of change of voltage level of the MVDC wind farm feeder to activate the crowbar circuit.

23. The method of claim 17, which further includes a plurality of wind turbines; and wherein each of the plurality of wind turbines is locally monitoring voltage of the MVDC wind farm feeder to individually activate a crowbar associated with each of the plurality of wind turbines.

* * * * *